(12) United States Patent
Ellingsen

(10) Patent No.: US 6,660,158 B1
(45) Date of Patent: Dec. 9, 2003

(54) CATALYTIC CRACKING PROCESS

(75) Inventor: Olav Ellingsen, Florø (NO)

(73) Assignee: EllyCrack AS, Floro (NO)

( * ) Notice: Subject to any disclaimer, the term of this patent is extended or adjusted under 35 U.S.C. 154(b) by 0 days.

(21) Appl. No.: 09/913,202

(22) PCT Filed: Feb. 10, 2000

(86) PCT No.: PCT/NO00/00051

§ 371 (c)(1),
(2), (4) Date: Aug. 9, 2001

(87) PCT Pub. No.: WO00/47695

PCT Pub. Date: Aug. 17, 2000

(30) Foreign Application Priority Data

Feb. 11, 1999 (NO) .......................................... 19990651

(51) Int. Cl.⁷ ............................................... C10G 11/00
(52) U.S. Cl. ....................................... 208/113; 208/158
(58) Field of Search .................................. 208/158, 113

(56) References Cited

U.S. PATENT DOCUMENTS

| 2,719,112 A | | 9/1955 | Kearby et al. ............... 208/409 |
| 2,759,880 A | * | 8/1956 | Brown ......................... 208/50 |
| 2,761,769 A | * | 9/1956 | Elder .......................... 422/143 |
| 5,348,644 A | | 9/1994 | Maroy et al. ............... 208/153 |

* cited by examiner

Primary Examiner—Walter D. Griffin
(74) Attorney, Agent, or Firm—Knobbe, Martens, Olson & Bear, LLP

(57) ABSTRACT

A catalytic cracking process is described wherein the cracking takes place in a reactor under the influence of a rotating fluidized bed catalyst and compressed gases and/or steam is injected in order to effect movement of the catalyst bed.

10 Claims, 4 Drawing Sheets

CATALYTIC CRACKING PROCESS

REFERENCE TO RELATED APPLICATIONS

This application is a National Phase filing under 35 U.S.C. §371 of PCT/NO00/00051 filed Feb. 10, 2000, which claims priority to Norwegian application #19990651, filed Feb. 11, 1999.

The present invention is related to a catalytic cracking and conversion process for upgrading of heavy oil in a hot fluidized bed in a vertical reactor whereby the gases leaving the reactor are be condensed or separated by distillation in a distillation tower.

The following general introduction to catalytic cracking, highlights present status and the outlined words and sentences focus on the difficulties/precautions which have to be met from case to case.

Catalytic cracker units (FCCU) processes are widely utilised in the petroleum industry in upgrading of oils. The 'heart' of such processes consists of a reactor vessel and a regenerator vessel interconnected to allow the transfer of spent catalyst from the reactor to the regenerator and of regenerated catalysts back to the reactor. The oil is cracked in the reactor section by exposing it to high temperatures and in contact with the catalyst. The heat for the oil cracking is supplied by the exothermic heat of reaction generated during the catalyst regeneration. This heat is transferred by the regenerated fluid catalyst stream itself. The oil streams (feed and recycle) are introduced into this hot catalyst stream en route to the reactor. Much of the cracking occurs in the dispersed catalysed phase along this transfer line or riser.

The final contact with the catalyst bed in the reactor completes the cracking mechanism. The vaporised cracked oil from the reactor is suitably separated from entrained catalyst particles by cyclones and routed to the recovery section of the unit. Here it is fractionated by conventional means to meet the product stream requirements. The spent catalyst is routed from the reactor to the regenerator after separation from the entrained oil. Air is introduced into the regenerator and the fluid bed of the catalyst. The air reacts with the carbon coating on the catalyst to form $CO/CO_2$. The hot and essentially carbon-free catalyst completes the cycle by its return to the reactor. The flue gas leaving the regenerator is rich in CO. This stream is often routed to a specially designed steam generator where the CO is converted to $CO_2$ and the exothermic heat of reaction used for generating steam (the CO boiler).

Feedstocks to the FCCU are primarily in the heavy vacuum gas oil range. Typical boiling ranges are 340° (10%) to 525° C. (90%). This gas oil is limited in end point by maximum tolerable metals, although the new zeolite catalysts have demonstrated higher metals tolerance than the older silica-alumina catalyst. The processes have considerable flexibility. Apart from processing the more conventional waxy distillates to produce gasoline and other fuel components, feedstocks ranging from naphtha to suitably pre-treated residuum are successfully processed to meet specific product requirement.

The fluid catalytic cracker is usually a licensed process. Correlations and methodology are therefore proprietary to the licensor although certain data are divulged to clients under the licensor agreement. Such data are required by clients for proper operation of the unit, and may not be divulged to third parties without the licensor's express permission.

These and others, including operating instructions, are required for the proper operation of the units. Most of the proprietary data, however, concern the reactor/regenerator side of the process. The recovery side—that is, the equipment required to produce the product streams from the reactor effluent—utilises essentially conventional techniques in their design and operating evaluation.

Up to the late 1980s feedstocks to FCCU were limited by characteristics such as high Condradson carbon and metals. This excluded the processing of the 'bottom of the barrel' residues. Indeed, even the processing of vacuum gas oil feeds were limited to Condradson carbon<10 wt %
Hydrogen content>11,2 wt %
Metals NI+V<50 ppm During the late 1980s significant research and development breakthroughs produced a catalytic process that can handle these heavy feeds and indeed some residues. Feedstocks heavier than vacuum gas oil when fed to a conventional FCCU tend to increase the production of coke and this in turn deactivates the catalyst. This is mainly the result of:

A high portion of the feed that does not vaporise. The un-vaporised portion quickly cokes on the catalyst, choking its active area.

The presence of high concentrations of polar molecules such as polycyclic aromatics and nitrogen compounds. These are absorbed into the catalyst's active area causing instant (but temporary) deactivation.

Heavy metals contamination that poison the catalyst and affect the selectivity of the cracking process.

High concentration of polynaphthenes that dealkylate slowly.

In the FCCU process conventional feedstock cracking temperature is controlled by the circulation of hot regen catalyst. With the heavier feedstocks, with an increase in Condradson carbon there will be a larger coke formation. This in turn produces a high regen catalyst temperature and heat load. To maintain heat balance catalyst circulation is reduced, leading to poor or unsatisfactory performance. Catalyst cooling or feed cooling is used to overcome this high catalyst heat load and to maintain proper circulation.

The extended boiling range of the feed as in the case of residues tends to cause an uneven cracking severity. The lighter molecules in the feed are instantly vaporised on contact with the hot catalyst and cracking occurs. In the case of the heavier molecules vaporisation is not achieved as easily. This contributes to a higher coke deposition with a higher rate of catalyst deactivation. Ideally, the whole feed should be instantly vaporised so that a uniform cracking mechanism can commence. The mix temperature (which is defined as the theoretical equilibrium temperature between the uncracked vaporised feed and the regenerated catalyst) should be close to the feed dew point temperature. In conventional units this is about 20–30 'C above the riser outlet temperature. This can be approximated by the expression:

$$T_m = T_R + 0_u 1 \, \Delta A H_c$$

$T_m$=the mix temperature
$T_R$=riser outlet temperature (° C.)
$\Delta Ah_c$=heat of cracking (BTU/lb or kJ/kg)

This mix temperature is also slightly dependent on the catalyst temperature. Cracking severity is affected by polycyclic aromatics and nitrogen. This is so because these compounds tend to be absorbed into the catalyst. Raising the mix temperature by increasing the riser temperature reverses the absorption process. Unfortunately, a higher riser temperature leads to undesirable thermal cracking and production of dry gas.

The processing of heavy feedstocks therefore requires special techniques to overcome:

Feed vaporisation.

High concentration of polar molecules.

Presence of metals.

Some of the techniques developed to meet heavy oil cracking processing are as follows:

Two-stage regeneration.

Riser mixer design and mix temperature control (for rapid vaporisation).

New riser lift technology minimising the use of steam.

Regen catalyst temperature control (catalyst cooling).

Catalyst selection for:

Good conversion and yield pattern.

Metal resistance.

Thermal and hydrothermal resistance.

High-gasoline RON.

An important issue in the case of heavy oil fluid catalytic cracking is the handling of the high coke lay-down and the protection of the catalyst. One technique that limits the severe conditions in regeneration of the spent catalyst is a two-stage regenerator.

The spent catalyst from the reactor is delivered to the first regenerator. Here the catalyst undergoes a mild oxidation with a limited amount of air. Temperatures in this regenerator remain fairly low, around 700–750° C. From this first regenerator the catalyst is pneumatically conveyed to a second. Here excess air is used to complete the carbon burn-off and temperatures up to 900° C. are experienced. The regenerated catalyst leaves this second regenerator to return to the reactor via the riser. The technology that applies to the two-stage regeneration process is innovative in that it achieves the burning off of the high coke without impairing the catalyst activity. In the is first stage the conditions encourage the combustion of most of the hydrogen associated with the coke. A significant amount of the carbon is also burned off under mild conditions. These conditions inhibit catalyst deactivation.

All the residual coke is burned off in the second-stage regenerator with excess air and in a dry atmosphere. All the steam associated with hydrogen combustion and carry-over from the reactor has been dispensed within the first stage. The second regenerator is refractory lined and there is no temperature constraint. The catalyst is allowed to come to equilibrium. Even at high regen temperatures under these conditions lower catalyst deactivation is experienced. The two-stage regeneration technique leads to a better catalyst regeneration as well as a lower catalyst consumption. Typically the clean catalyst contains less than 0.05% wt of carbon. This is achieved with an overall lower heat of combustion. Since the unit remains in heat balance, coke production stays essentially the same.

It has been found that there is a specific catalyst temperature range that is desirable for a given feed and catalyst system. A unique dense phase catalyst cooling system provides a technique through which the best temperature and heat balance relationship can be maintained.

It is reported that 69% of the enthalpy contained in the heat input to the reactor is s required just to heat and vaporise the feed. The remainder is essentially available for conversion. To improve conversion it would be very desirable to allow more of the heat available to be used for conversion. The only variable that in conventional FCCU's units can be changed to achieve this requirement, is the feed inlet enthalpy, that is, through preheating the feed. Doing this, however, immediately reduces the catalyst circulation rate to maintain heat balance. This has an adverse effect on conversion. The preheating of the feed can, however, be compensated for by cooling the catalyst. Thus the catalyst circulation rate can be retained and, in many cases, increased indeed, by careful manipulation of the heat balance the net increase in catalyst circulation rate can be as high as 1 unit cat/oil ratio. The higher equilibrium catalyst activity possible at the lower regeneration temperature also improves the unit yield pattern.

In residue cracking commercial experience indicates that operations at regenerated catalyst temperatures above 900° C. result in poor yields with high gas production due to local thermal cracking of the oil on contact. Where certain operations require high regen temperatures the installation of a catalyst cooler will have a substantial economic incentive. This will be due to improved yields and catalyst consumption.

There are two types of catalyst coolers available:

Back-mix.

Flow-through.

The back-mix cooler boiler feedwater flows tube-side in both cooler types. The catalyst in the back-mix cooler circulates around the tube bundle on the shell side. The heat transfer takes place in a dense low-velocity region so erosion is minimised. The back-mix cooler can remove approximately 50 million kJ/hr.

The flow-through cooler as the name suggests, the catalyst flows once through on the shell side of this cooler. Again erosion is minimised by low-velocity operation in the dense phase. This type of cooler is more efficient than the back-mix. This unit can achieve heat removal as high as 100 million kJ/hr.

The equilibrium temperature between the oil feed and the regenerated catalyst must be reached in the shortest possible time. This is required in order to ensure the rapid and homogeneous vaporisation of the feed. To ensure this it is necessary to design and install a proper feed injection system. This system should ensure that any catalyst back-mixing is eliminated and that all the vaporised feed components are subject to the same cracking severity.

Efficient mixing of the feed finely atomised in small droplets is achieved by contact with a pre-accelerated dilute suspension of the regen catalyst. Under these conditions feed vaporisation takes place almost instantaneously.

The regen catalyst stream from the regenerator is accelerated by steam or lift gas injection to move up the riser. The oil feed is introduced atomised by steam into the catalyst environment. The main motive steam into the riser is introduced below the feed inlet point. Good mixing occurs in this section with maximum contact between oil, catalyst and the steam.

In heavy oil cracking the proper selection of catalyst enables even the most bulky molecules to reach the active catalyst zone. Such zeolite catalysts have a high silicato-alumina ratio which cracks the heavy molecules into sizes that can enter the active zone.

Another problem that is met with in heavy oil cracking is the possibility of the heavier portion of the oil being below its dew point. To ensure that this is overcome the mix temperature must be set above the dew point of the feed. The presence of polycyclic aromatics also affects cracking severity. Increasing the mix temperature to raise the riser temperature reverses the effect of polycyclic aromatics. In so doing, however, thermal cracking occurs, which is undesirable. To solve this problem it is necessary to be able to control the riser temperature independently to mix temperature.

Mix temperature control (MTC) is achieved by injecting a suitable heavy-cycle oil stream into the riser above the oil feed injection point. This essentially separates the riser into two reaction zones. The first is between the feed injection and the cycle oil inlet. This zone is characterised by a high mix temperature, a high catalyst-to-oil ratio and a very short contact time.

The second zone above the cycle oil inlet operates under more conventional catalytic cracking conditions. The riser temperature is maintained independently by the introduction of the regen catalyst. Thus an increase in cycle oil leads to a decrease in riser temperature which introduces more catalyst. This finally increases the mix temperature and the catalyst-to-oil ratio and decreases the regenerator temperature.

As described earlier, it is highly desirable to achieve good catalyst/oil mixing as early and as quickly as possible. The method described to achieve this requires the pre-acceleration and dilution of the catalyst stream. Traditionally, steam is the medium used to maintain catalyst bed fluidity and movement in the riser. Steam, however, has a deleterious effect on the very hot catalyst that is met in residue cracking processes. Under these conditions steam causes hydrothermal deactivation of the catalyst.

Much work has been done in reducing the use of steam in contact with the hot catalyst. Some of the results of the work showed that if the partial pressure of steam is kept low, the hydrothermal effects are greatly reduced in the case of relatively metalfree catalysts. A more important result of the work showed that light hydrocarbons impart favourable conditioning effects to the freshly regenerated catalyst. This was even pronounced in catalysts that were heavily contaminated with metals.

Light hydrocarbon gases have been introduced in several heavy oil crackers since 1985. They have operated either with lift gas alone or mixed with steam. The limitations to the use of lift gas rests in the ability of downstream units to handle the additional gas.

The cracked products leaving the FCCU reactor represent a wide range of cuts. This reactor effluent is often referred to as a 'syn' crude because of its wide range of boilingpoint material.

The 'syn' crude assay should contain at least a TBP (Thrue Boiling Point) curve with an analysis of light ends, a gravity versus mid-boiling point curve and a PONA for the naphtha and sulphur content versus mid-boiling point for the 'syn' crude.

The present invention is showing a FCCU cracking unit which aims in reducing a number of the obstacles associated with existing FCCU-units and more specific, showing a FCCU-unit which can be built for small scale operation at a well side whereby heavy feedstock can be processed at the source. The advantage by this is that feedstock with severe transport properties (pumping capability) can be converted into excellent transport conditions.

The present process consists of the following main component:

1. A reactor of the design of a cyclone.
2. A catalyst regenerator.
3. A condenser or distillation system.
4. A cooling system for the condensation.
5. A gas circulation system.
6. A preheating system for the feed.
7. An injection system of the feed.

Figure 1:
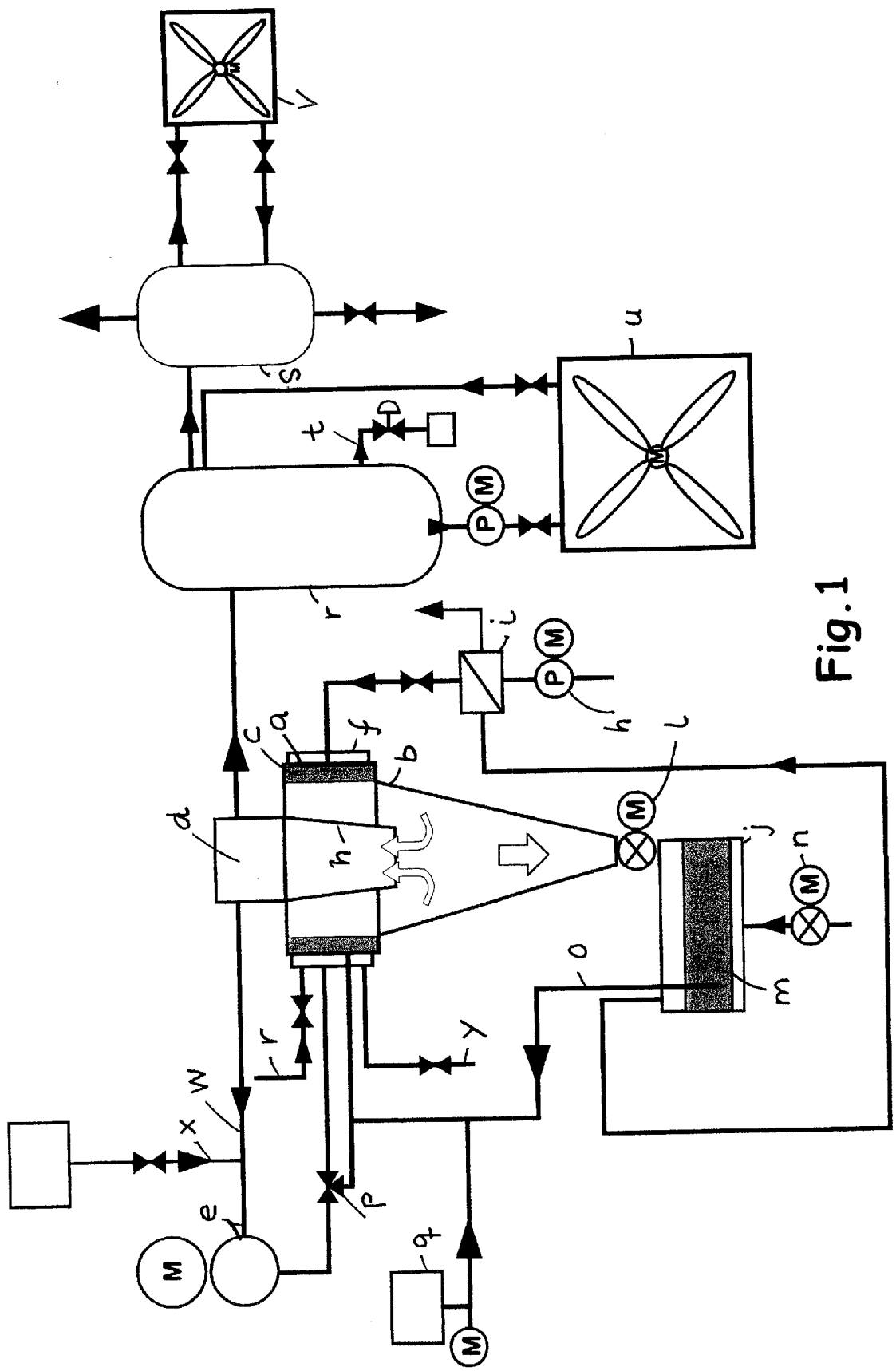
FIG. 1 shows a schematic view of the catalytic cracking process.
Figure 2:
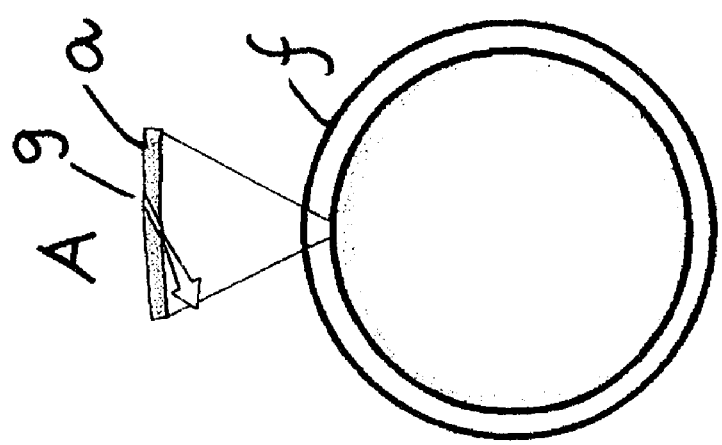
FIG. 2 shows an inlet for regenerated catalyst brought into the reactor via one or more tangential oriented pipes, A.

With the reference to FIG. 1, the process is described in detail.

The cylindrical part of the cyclone a) has a larger diameter than the conical part b) of the cyclone thus creating a <<space>> c) where the catalyst is put into rapid and severe rotation.

The rotation of the catalyst is obtained by circulating a part of the effluents leaving the reactor at d). A portion of the effluent at process condition (pressure and temperature) is sucked off by a gas compressor or a fan e) which compresses the gases to a pressure between 1–20 bars, preferably 7 bars pressure whereby the temperature is increased equal to the compression work delivered by the gas compressor e). The gas which, consists of HC-gas, steam and CO and $CO_2$ is injected via into the jacket f) surrounding the cylinder a) of the reactor.

In the cylindrical part a) is arranged tangential slots g) as shown in detail A. When the gases enters the (<<space>> c) via the slots g) with velocity between 20–300 m/s preferably 80 m/s, the gases and the catalyst are put into rotating movement equal to the radius of a) whereby it is given an acceleration expressed by $a=v^2/r$ where v is the inlet velocity and r is the radius of a). The centrifugal forces against a) is expressed by $F=mv^2/r$.

The accumulated heat in the gas delivered by the gas compressor e) is delivered in the fluidized catalyst and participate in maintaining the process temperature.

The oil is charged into the reactor by the pump h) via the heat-exchanger i) where it is preheated by the fluidizing effluents leaving the regenerator j). The oil is charged into the reactor through nozzles in a) or alternatively into the jacket f) where it is mixed in atomised state with the gas stream delivered by e).

When the oil enters the fluidized catalysts, it is cracked into lighter fraction which leaves the reactor through the duct k).

The deactivated catalysts which can be silica sand, zeolites, alumina silicate or other fine-grained catalytic materials, falls down the conical part of the reactor as in an ordinary cyclone and is discharged into the regenerator j) via a rotating valve 1). In the bottom of the regenerator is arranged a fluidizer m). When air is pumped into the fludizer m) by the pump n) and passes through the deactivated solids containing atomised coke, the coke is oxidised (combusted), and regenerated. The regenerated catalyst is pneumatic sucked off from the regenerator through the riser line o) by diverted gas from e) regulated by the 3-way valve p). Inlet of regenerated solids are made tangential into the space c) as for the gas-inlet.

Makeup of lost catalyst is done from the storage hopper q)-either delivered by a screw conveyor or pneumatically.

Additional energy can be obtained by injection of air into the jacket f) by the pipe r) whereby a partial combustion of the HC-gases in the gas-stream from e) will take place in f). The hot combustion gases (CO, $CO_2$ and NOx) will enter the reactor together with non-combusted gases. The gases leaving the reactor via k) will thus consist of HC-gases, steam and CO, CO, and Nox. The portion of the gases which is not circulated to the reactor by e) will pass to a condensing system consisting of a condenser r) and s) or a conventional distillation column. By the illustrated condenser system, the condenser r) condenses the HC-gases at a temperature about 100 C whereby oil is discharged via t) to the receiver. The condenser can be of baffle-tray, scrubber or shell type. When using a scrubber or a baffle-tray condenser, recovered oil is used as condensing medium by that oil from the bottom of the condenser is pumped via a oil cooler u) which can be air or water cooled to the top of the condenser where it will mix with the gases from the reactor, condense, and these fall to the bottom of the condenser.

As the condenser is set to a temperature above the partial boiling-point of water, steam is passed to a steam-condenser s) which can be of shell type. By this arrangement, water is used as a condensing medium and the heat of condensation is removed by the cooler v). Water is discharged at the bottom of the condenser and passes to the receiver. Non-condensable gases is vented at the top of the condenser and is either flared of or brought to a CO-boiler.

By start up of the process, this is obtained by passing steam to the line w) by the line x). When sufficient catalyst is retained in the space c), natural gas (methane) is supplied from the line y) to the jacket f) where it together with air from r) is ignited and heats the fluidized bed as described above. When operational conditions are obtained the gas is gradually shut off and the combustion is maintained by the combustible gases delivered by e).

Figure 3:
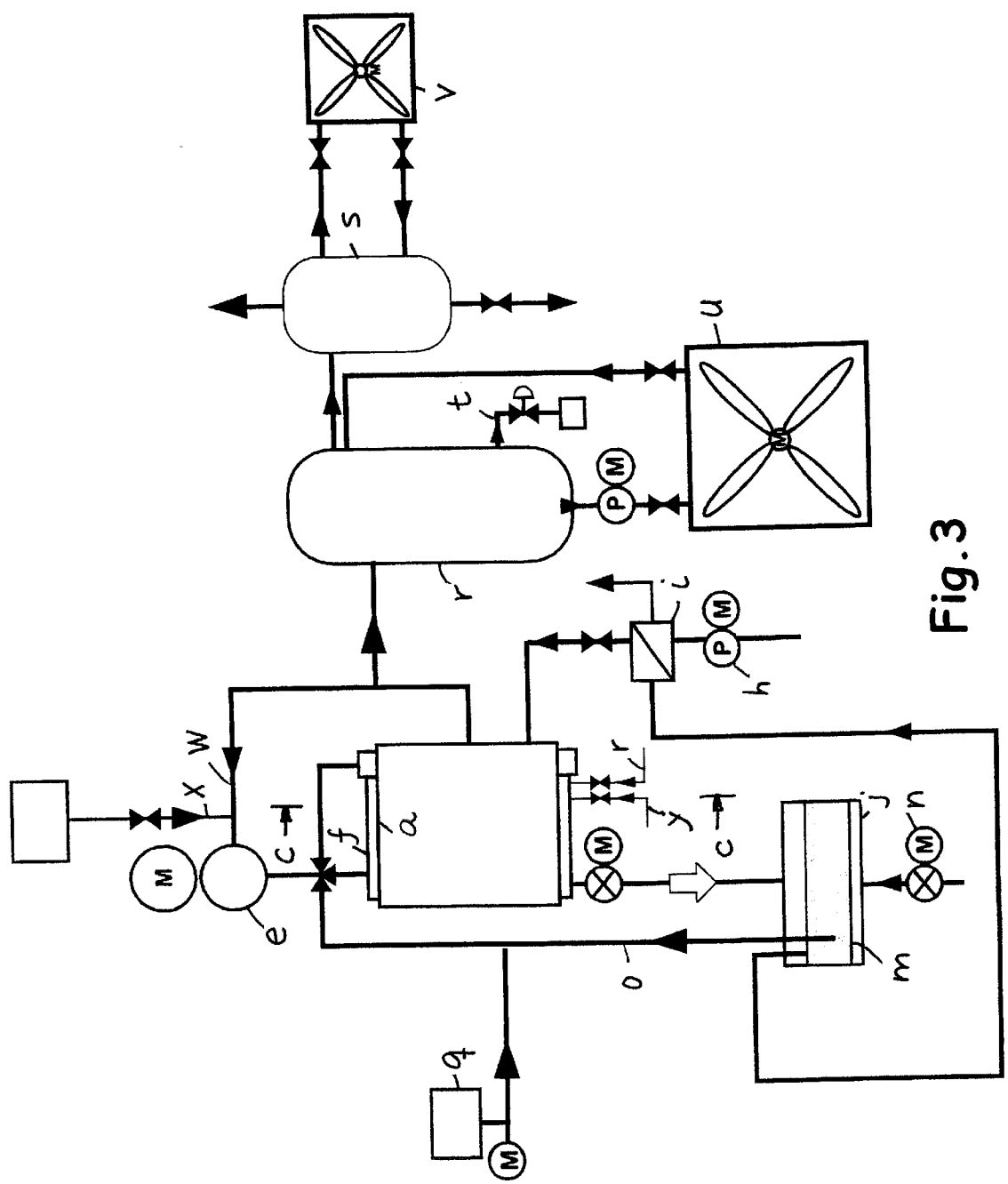
FIG. 3 shows a horizontally arranged reactor where the letters otherwise have the same meaning as described for FIG. 1.
Figure 4:
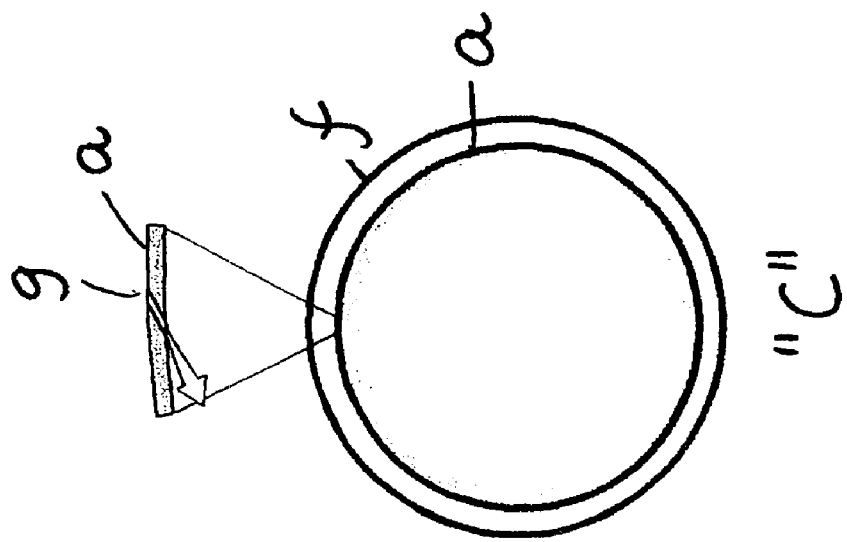
FIG. 4B shows an inlet for regenerated catalyst brought into the reactor via one or more tangential oriented pipes, A.
FIG. 4C shows a cut through the reactor at C—C (FIG. 1).
Figure 4:
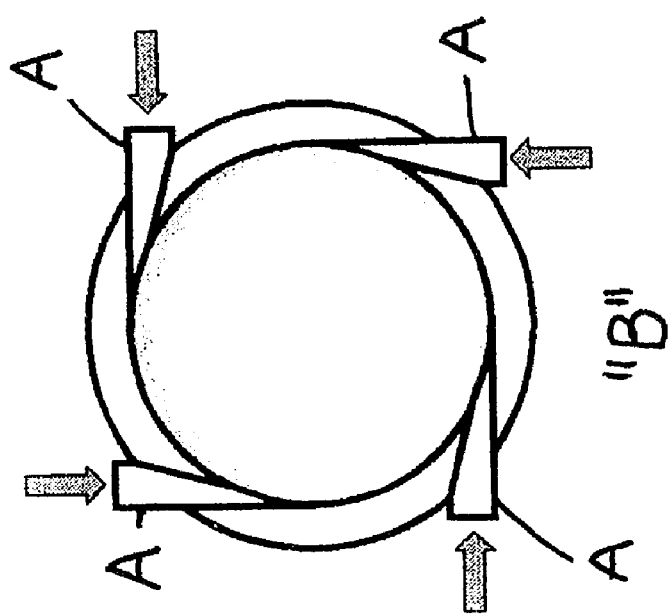

It shall be understood that the reactor can have any other suitable design which can apply to the invention and it can also be arranged horizontally as the centrifugal force from the rotating fluidized bed will keep the catalyst at the wall. Such an arrangement is shown in FIG. 3 where a) shown an horizontal arranged reactor where the letters otherwise have the same meaning as described for FIG. 1. The inlet of regenerated catalyst is brought into the reactor in one or more tangential oriented pipes A) as shown in FIG. 4, detail B. Detail C shows a cut through the reactor at C—C, FIG. 1 showing the reactor wall a) with the slots g) for the gas inlet to the reactor and the jacket f).

Further more it is to be noted that the regeneration system may be designed in different manners. For example, it may consist of a fluidizer column whereby both the regenerated catalysts and the combustion air are brought back to the reactor.

Because of the centrifugal forces of the catalysts in the reactor, a far better action on the hydrocarbon is achieved than is known from other FCCU units. Experiments have shown that decant oil of from existing FCCU units can be cracked at a temperature of 400 C and residuum from a vacuum distillation tower has successfully been cracked at 350 C.

What is claimed is:

1. A catalytic cracking process, comprising cracking an oil in a reactor under the influence of a rotating fluidized bed catalyst and injecting compressed gases and/or steam into the reactor to effect vertical rotational movement of the catalyst bed.

2. The catalytic cracking process according to claim 1, wherein the reactor is formed as a cyclone whereby the catalyst which is deactivated by the process is evacuated from the reactor and is discharged to a regenerator via a rotating valve system.

3. The catalytic cracking process according to claim 2, wherein the cyclone is arranged horizontally.

4. The catalytic cracking process according to claim 1, wherein a portion of the gas and/or steam which becomes off-gases from the reactor are sucked off by a gas compressor or fan, compressed and injected into the reactor via tangential slots in the reactor whereby the gases and the catalyst are put into rotating movement in the reaction.

5. The catalytic cracking process according to claim 4, wherein the gases from the gas compressor or fan are brought to a combustion chamber surrounding the reactor before entering the reactor, and wherein a portion of the gases are ignited by the aid of air being injected into said chamber and wherein the hot gases, due to the combustion, contribute to maintaining the process temperature in the reactor.

6. The catalytic cracking process according to claim 5, wherein the catalyst which is deactivated by the process is regenerated in the combustion chamber by injecting air into the catalyst and wherein the evacuating heated air is used to preheat oil fed to the reactor.

7. The catalytic cracking process according to claim 6, wherein the catalyst is regenerated and returned to the reactor by a pneumatic action of a portion of the gases from the gas compressor and wherein the catalyst is modified by delivering new catalyst to a riser-line of regenerated catalyst.

8. The catalytic cracking process according to claim 5, wherein natural gas is added to the combustion chamber to participate in the combustion.

9. The catalytic cracking process according to claim 1, wherein gases produced by the process are brought to a condenser system comprising either an oil and steam condenser or a distillation column.

10. The catalytic cracking process according to claim 2, wherein the cyclone is arranged vertically.

* * * * *